(12) United States Patent
Vivanco

(10) Patent No.: US 12,413,340 B2
(45) Date of Patent: Sep. 9, 2025

(54) REPEATING SYSTEM INFORMATION MESSAGES DELIVERY IN ADVANCED NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 336 days.

(21) Appl. No.: 17/932,150

(22) Filed: Sep. 14, 2022

(65) Prior Publication Data
US 2024/0089032 A1    Mar. 14, 2024

(51) Int. Cl.
*H04L 1/08* (2006.01)

(52) U.S. Cl.
CPC ...................... *H04L 1/08* (2013.01)

(58) Field of Classification Search
None
See application file for complete search history.

(56) References Cited

U.S. PATENT DOCUMENTS

| | | | | |
|---|---|---|---|---|
| 2016/0337931 | A1* | 11/2016 | Wang | H04W 48/20 |
| 2018/0310235 | A1 | 10/2018 | You et al. | |
| 2019/0159110 | A1* | 5/2019 | Takahashi | H04W 48/10 |
| 2019/0174554 | A1* | 6/2019 | Deenoo | H04W 68/005 |
| 2019/0246319 | A1 | 8/2019 | Lee et al. | |
| 2019/0261421 | A1* | 8/2019 | Peisa | H04B 17/309 |
| 2019/0313260 | A1* | 10/2019 | Zhang | H04W 16/26 |
| 2019/0357227 | A1 | 11/2019 | Khirallah et al. | |
| 2020/0178253 | A1* | 6/2020 | Gao | H04L 12/4015 |
| 2020/0236613 | A1* | 7/2020 | Frenger | H04B 7/0617 |
| 2022/0377649 | A1* | 11/2022 | Choi | H04W 48/12 |
| 2023/0007621 | A1 | 1/2023 | Fu et al. | |
| 2024/0089800 | A1 | 3/2024 | Vivanco | |
| 2024/0089829 | A1 | 3/2024 | Vivanco | |
| 2024/0098679 | A1 | 3/2024 | Ghimire et al. | |

OTHER PUBLICATIONS

"Non-Final Office Action for U.S. Appl. No. 17/932,058", Dec. 18, 2024, 24 pages.

* cited by examiner

*Primary Examiner* — Jamaal Henson
(74) *Attorney, Agent, or Firm* — Guntin & Gust, PLC; Miyoung Shin

(57) ABSTRACT

The disclosed technology is directed towards user equipment requests for delivery of other system information block (SIB) data from a base station, in which one or more repetitions of the other SIB data transmissions can be requested in a single request. Transmitting repeated response messages reduces the need for the user equipment to retry the requesting procedure when errors occur with respect to correctly receiving a single instance of the other SIB data. The user equipment can measure signal quality and obtain reported signal quality by the base station. The user equipment determines repetition data, based on the signal quality difference, for delivery of the other SIB data. The request sent by the user equipment includes the repetition data, whereby the base station repeats the transmission of instances of the other SIB data to increase the likelihood that an instance will be correctly received and decoded by the user equipment.

20 Claims, 10 Drawing Sheets

REPEATING SYSTEM INFORMATION MESSAGES DELIVERY IN ADVANCED NETWORKS

TECHNICAL FIELD

The subject application relates to the delivery of system information to user equipment via advanced networks, e.g., fifth generation networks and beyond.

BACKGROUND

System information (SI) for user equipment is classified into a master information block (MIB) and system information blocks (SIBs). The master information block includes fundamental information needed by user equipment to begin to communicate, including system frame number and system bandwidth data, and is periodically broadcast on the physical broadcast channel (PBCH). System information blocks contain scheduling and cell access information, and are broadcast on the physical downlink shared channel (PDSCH).

In new radio, including fifth generation (5G) networks, the master information block and system information block type1 (SIB1) are defined as minimum SI, while the other system information blocks (SIB2, SIB3, and so on) are defined as other SI. The minimum SI contains the basic information for acquiring the other SI blocks and processing initial access, and is broadcast periodically in a system information window by the base station (a gNodeB (gNB) in 5G). Unlike minimum SI delivery, the other SI contains additional information that can be delivered on demand when needed, referred to in 5G new radio as on-demand SI delivery.

With respect to other SI delivery, network operators configure each base station to either broadcast the other SIB(s) or send them in response to a request from each user equipment device. This is indicated to the user equipment via a si-BroadcastStatus data element in the SIB1 message, set as either si-BroadcastStatus='broadcasting' or si-BroadcastStatus='notbroadcasting'. If not broadcasting the other SI, a user equipment device proceeds with a random access procedure to acquire the other SIB(s), including requesting the other SI, and monitoring the next SI window to receive the other SIB(s), which can be a broadcast or unicast communication.

There are situations in which the other SIB(s) are requested from the base station, and sent by the base station in response, but not properly received by the user equipment device, e.g., not received or corrupt because of poor signal quality. This results in the user equipment device retrying the requesting, transmitting and receiving process. Retrying sometimes occurs more than once, which consumes device resources and increases signaling overhead on the network.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
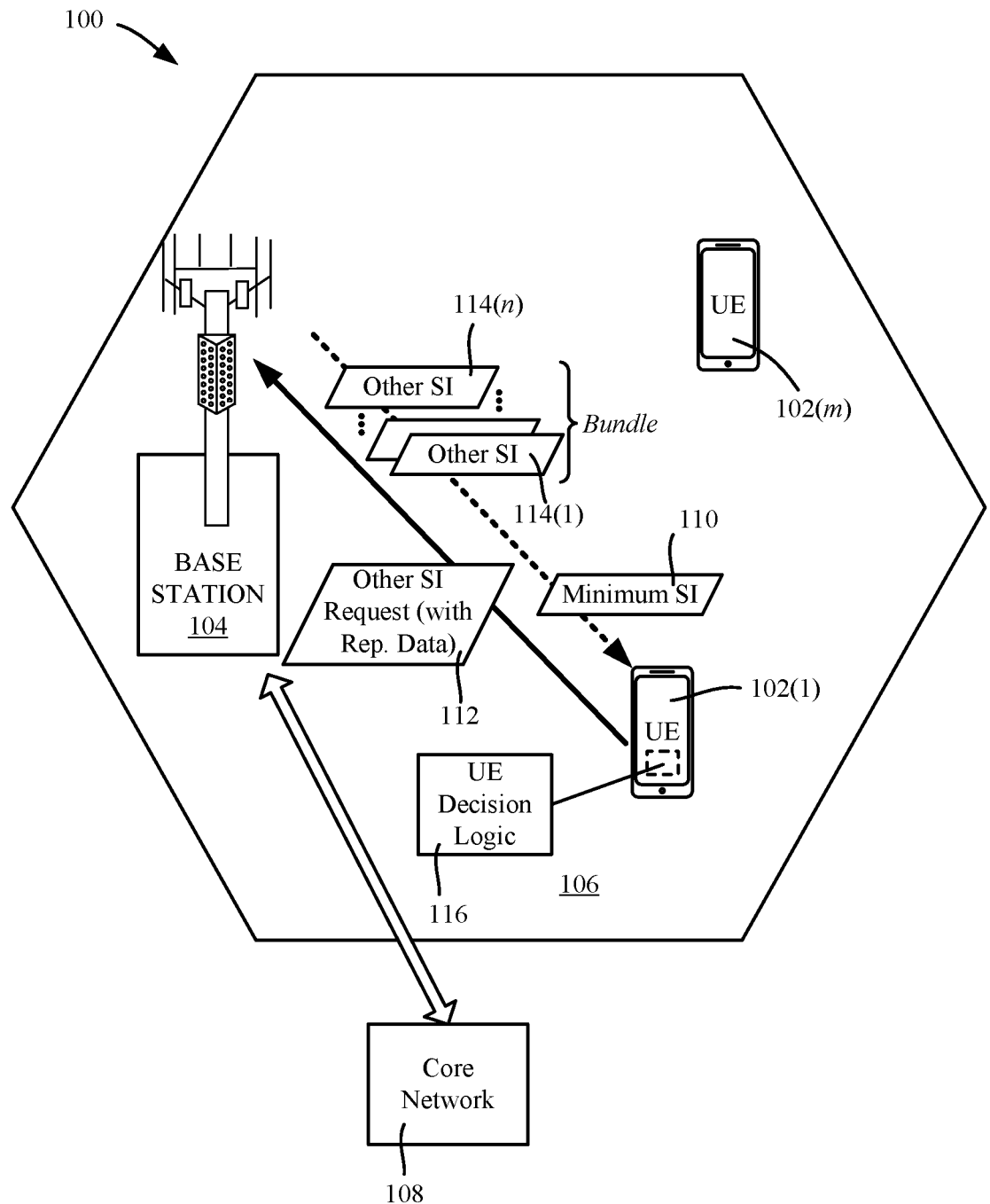
FIG. 1 is a block diagram of an example system in which user equipment device can request other system information block data in bundled transmission repetitions, in accordance with various aspects and embodiments of the subject disclosure.

The technology described herein is generally directed towards improving system usage over advanced (e.g., fifth generation networks and beyond) with respect to on-demand system information delivery to user equipment (UE) devices. The technology described herein is based on a user equipment requesting from a base station, on-demand delivery of other system information block (SIB) data (e.g., SIB2, SIB3, and so on) in a bundle of transmitted response messages, to reduce errors that can occur with respect to correctly receiving the other system information block data in a single delivery attempt.

In one implementation, via the technology described herein a user equipment device evaluates signal quality based on communicating with the base station, and can request that the transmission of the other system information block data be repeated over multiple repetition instances. For example, with poor signal quality, a larger repetition level is specified by the user equipment than if the signal quality is good, which increases the chances of successfully receiving an instance of the other system information block data. This can eliminate the need for the user equipment to retry requesting of the other SIB data, which reduces user equipment battery consumption as well as the network's signaling overhead from repeated requests. Battery level optionally can factor into the repetition level data, e.g., to request more repetitions if the battery is low to further increase the chances of successfully receiving an instance of the other system information block data and not having to consume further battery power to repeat the request.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising a number of user equipment devices (UEs)/mobile devices 102(1)-102(m) coupled to a base station 104 associated with a cell 106. In turn, the base station 104 is coupled to a core network 108, such as, but not limited to, mobile edge compute (MEC), self-organizing network (SON) and/or a radio access network (RAN) intelligent controller (RIC).

The minimum system information (MIB and SIB1) is periodically broadcast. This is shown in FIG. 1 via block 110.

When the base station 104 is not broadcasting the other system information block (SIB) data, that is, is sending the other SIB data on demand, only upon receiving a system information request from a UE will the base station deliver the requested other SIB data in the system information window (in a listening/response period), in which the response can be either broadcast or unicast. The base station 104 can utilize beams to sweep over the whole-cell coverage. In one implementation, the base station 104 broadcasts on one beam at a time so that the cell is entirely covered after a full sweeping. The UE request mechanism for on-demand SI can also be designed in different ways; when UEs request the SI through the random access procedure, the request message can be either MSG1-based or MSG3-based.

The UE 102(1) in this example makes the other system information request, represented in FIG. 1 via block 112. As described herein, the other system information request 112 can request a bundle of other SIB responses, e.g., by including repetition data ("Rep. Data" in FIG. 1) as part of the request 112.

When the base station receives the request 112, the base station responds with one or more other system information block data responses, e.g., the responses 114(1)-114(n) transmitted in a bundle. The other SIB transmissions, repeated in the bundle, can occur in a single transmission time interval (TTI) or consecutive TTIs.

As shown in FIG. 1, the user equipment includes decision logic 116 that determines, based on signal quality data (and possibly other data), how many repetitions are to be specified in the request, that is, based on an estimated likelihood of receiving one instance of an other SIB data transmission that is correctly received and decoded. In general, the poorer the signal quality, the larger the number of repetitions specified. For very good/excellent signal quality, no repetitions (a single other SIB data transmission) can be specified.

Figure 2:
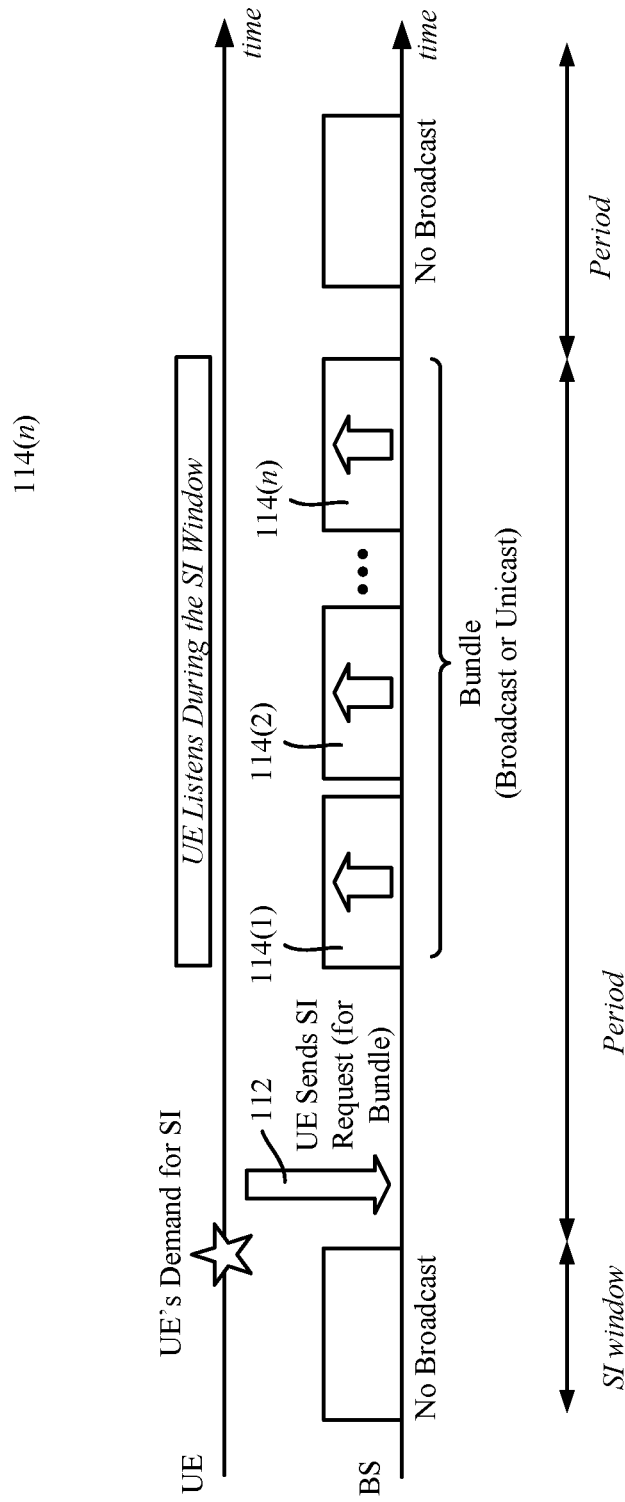
FIG. 2 is an example timing diagram of showing communications when a user equipment device requests transmission of multiple instances of other system information block data from a base station, in accordance with various aspects and embodiments of the subject disclosure.

Following the other system information request 112, shown as an arrow in the timing diagram of FIG. 2, the UE 102(1) monitors the next SI window to receive the requested other SIB data (the other SI block(s)) from the base station (BS). The on-demand response can be broadcast or unicast to the requesting UE, but is not transmitted unless and until the base station receives the request. In general, a UE such as the UE 102(1) is configured to repeat the request if the response is not timely received and/or is corrupt upon decoding. However, as described herein, multiple instances of the other SIB response can be requested, thus reducing the chances of no correct instance being received. In the timing diagram of FIG. 2, the repetition data in the request 112 requested n instances, resulting in the response instances 114(1)-114(n) being transmitted by the base station.

By way of a more particular example, consider a scenario in which a UE is camped into a given gNB, and this gNB is configured with SI-BroadcastStatus='notbroadcasting' as indicated via the in SIB1 message (part of the minimum system block data). Because of the not broadcasting status, the UE sends an SI request to ask for the other SI-elements that are needed for the UE to synchronize with the gNB. The UE can request the other SI-Elements by triggering RACH (random access channel) procedure, using the PRACH preamble(s) and PRACH resource(s) in SI-RequestConfig corresponding to the SI message(s) that the UE requires. After a successful RACH procedure, the UE receives the other SI messages. In the case in which there is a RACH failure with respect the system information request, it is up to UE implementation to retry the previously unsuccessful other system information request, which sometimes occurs often without the benefit of the technology described herein.

A RACH failure may manifest while the UE is under fading conditions (e.g., the UE is located at the cell edge), which may result in the UE failing to receive/decode properly the SI-elements. Under these circumstances, in prior systems the UE has to retry the procedure, that is, resend the system information request and go through the same process, possibly several times. Indeed, the current on demand system information delivery process does not provide feedback from the UE to the gNB acknowledging that the system information elements have been received/decoded properly by the UE. Therefore, in existing systems, the gNB and UE may need to engage in multiple request-and-transmit sequences until the SI-elements are received/decoded properly by the UE.

Figure 3:
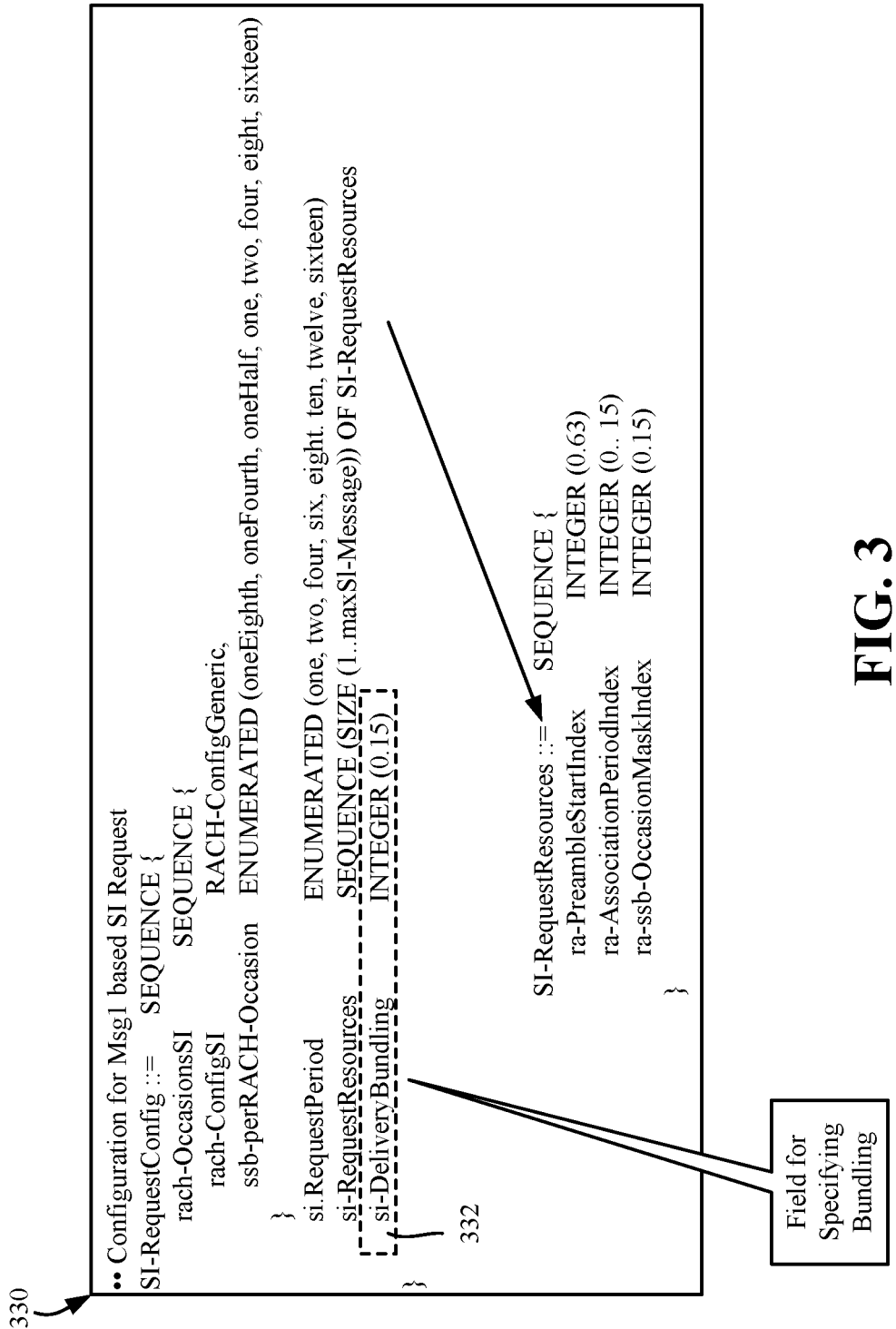
FIG. 3 is an example data structure showing a request for system information block data that includes a field by which transmission of multiple instances of other system information block data can be requested by a user equipment device, in accordance with various aspects and embodiments of the subject disclosure.

The technology described herein facilitates reducing the need to retry the procedure. To this end, FIG. 3 shows how the UE's request message (data structure 330) for the other system information elements is communicated through the random access procedure. In the example of FIG. 3, the request message is MSG1-based. In FIG. 3, a UE is configured to add a new, extra field in the system information request message data structure 330, (whether in the MSG1-based or MSG3-based request). This extra field includes repetition data based on the likelihood that the UE will correctly receive/decode the system information element(s). In the example of FIG. 3, this new field (emphasized via dashed block 332) includes the new parameter, denoted as si-Delivery-Bundling in one implementation. Note that this is only one example, and such a field can be located in one of many possible locations in the data structure 330.

Thus, the decision logic 116 (FIG. 1) in the UE adds the extra field 332 in the system information request message. The extra field 332 contains repetition data based on the likelihood of the UE to correctly receive/decode the SI-element. Counterpart logic that recognizes this field and the parameter value therein can be placed at the base station, and/or a central node global control located on the core network, e.g., mobile edge compute (MEC), self-organizing network (SON) or RAN intelligent controller (RIC).

In one implementation, the parameter value in the si-Delivery-Bundling corresponds to the likelihood that one, or more than one, other system information block delivery attempts will be needed. The si-Delivery-Bundling value can be estimated by the UE based on path loss conditions; this can be done by comparing the measured strength of the reference signal (measured RSRP) against its corresponding reported value (reported RSRP) in the SIB1 that was received as part of the minimum system information block data broadcast.

For example, in one implementation si-Delivery-Bundling=0 denotes that is very likely that the UE will receive the SI-element upon the first transmission (UE is at sufficiently good RF signal conditions), whereby the UE does not request any additional transmissions. An si-Delivery-Bundling value greater than zero (>0) denotes that is likely that UE will not receive the other system information element data in a single transmission/delivery attempt, and therefore retransmission is likely needed (e.g., the UE is at fading conditions and the RF signal conditions are not good, possibly poor or very poor, and so on). Thus, as described herein retransmission is proactively requested; a larger si-Delivery-Bundling value is used to proactively request the additional retransmissions from the gNB.

At the gNB, the other system information request message is received for a given UE, including the new si-Delivery-Bundling field. Based on the si-Delivery-Bundling value, the network equipment logic operates to repeat the broadcast message of the requested other system information element(s).

By way of example, in one implementation the following values can be used for the si-Delivery-Bundling parameter value (note that in this implementation, zero or one mean the same, a single transmission):

SI-Delivery-Bundling=0→gNB should transmit SI-elements one time;
SI-Delivery-Bundling=4→gNB should transmit SI-elements four times;
SI-Delivery-Bundling=6→gNB should transmit SI-elements six times.

It is alternatively feasible to have the value indicate the number of retransmissions, with one transmission implied, e.g., si-Delivery-Bundling=0 means transmit once, SI-Delivery-Bundling=1 means transmit once plus one retransmission, and so on. Still other codes/information can be used; e.g., the UE can specify a signal quality difference ranging from zero to seven, which the base station can convert to the number of retransmissions, possibly factoring in how busy the base station is, whether the base station is already broadcasting the other SIB data in response to frequent requests, and so on. For example, if the base station is going to be broadcasting the other SIB data four times in response to a previous request from a different UE, when another request for six repeated broadcasts is received before sending, the base station can simply increase the number to the largest value (six) and transmit six instances to both requesting UEs.

Figure 4:
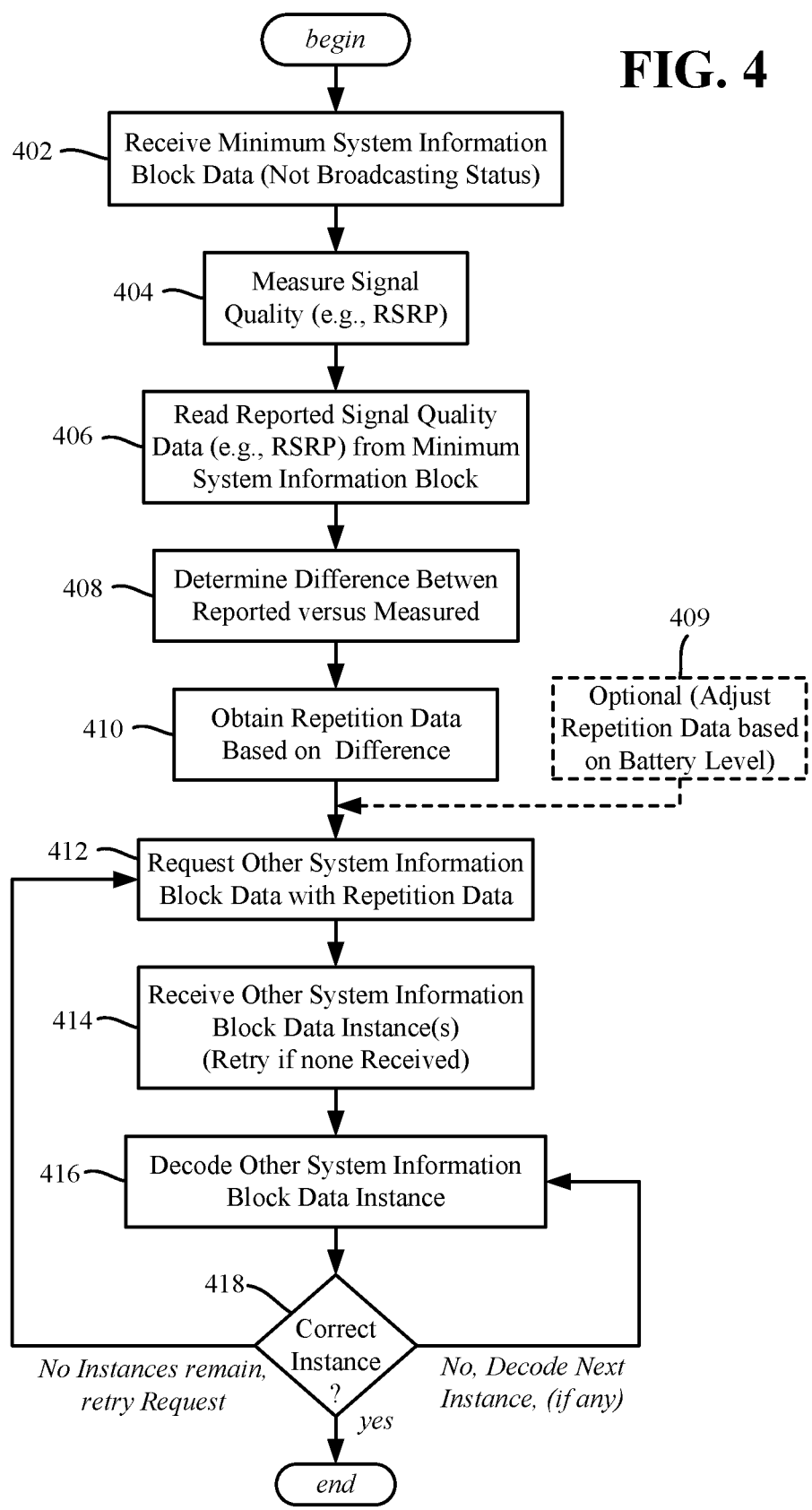
FIG. 4 is a flow diagram representing example operations related to a user equipment device requesting one or more transmission instances of other system information block data from a base station, in accordance with various aspects and embodiments of the subject disclosure.

FIG. 4 is a flow diagram showing example operations that can be performed by user equipment, beginning at operation 402 which represents receiving the minimum system information block data. Note that in this example, the minimum system information block data indicates that the base station is operating on demand, that is, the UE logic recognizes that the base station not broadcasting the other system information block data unless explicitly requested by a UE.

As represented by operation 404, the UE measures the signal quality, e.g., the reference signal received power data (measured RSRP) based on the communication with the base station. At operation 406 in this example, the UE reads the reported RSRP from the SIB1 in the minimum system information block data. Operation 408 determines the difference, which can a simple subtraction or a more complex calculation.

In any event, based on the difference, operation 410 obtains repetition data, e.g., a repetition count. This can be obtained via a lookup table, a hash computation that fits the determined difference value into one bucket of a range of buckets, and so on. This value is the basis for the number of transmissions that the base station will make to attempt delivery, that is, the parameter value entered into the si-Delivery-Bundling field.

Operation 409 represents an optional operation that can adjust the repetition data based on some other condition, such as battery level of the user equipment device. For example, a user equipment device with a very low battery, even if determined to be within reasonable signal quality conditions, may increase the parameter value to ensure that a retry request is more unlikely to be needed, thereby reducing even more the need for a retry request which, if made, would consume more power. This is only one example, and it can be readily appreciated that other conditions may be the basis for extra retransmissions.

Operation 412 represents sending the request, including the repetition data (e.g., in the si-Delivery-Bundling field's parameter value) to the base station. Operation 414 represents receiving the other system information block data, in which a retry is only attempted if nothing is received, e.g., via the existing retry process described herein.

If at least one instance of the other system information block is received, operation 416 decodes the data in that instance. If successful (at operation 418, which evaluates for a correctly decoded instance), the process ends as the user equipment now has the needed other system information block data. If not successful at operation 418, the next received other system information block is decoded and so on, until the data is correct and the process ends, or no instances remain to evaluate. If none remain, the request is repeated by returning to operation 412 and so on, possibly increasing the repetition data value based on the unsuccessful decoding, or based on not having received as many instances as requested. Note that while not explicitly shown in FIG. 4, it is understood that the user equipment can exit the loop (back to operation 412), such as if the user equipment is handed off to a new cell with a new SIB1 received, and so on.

Figure 5:
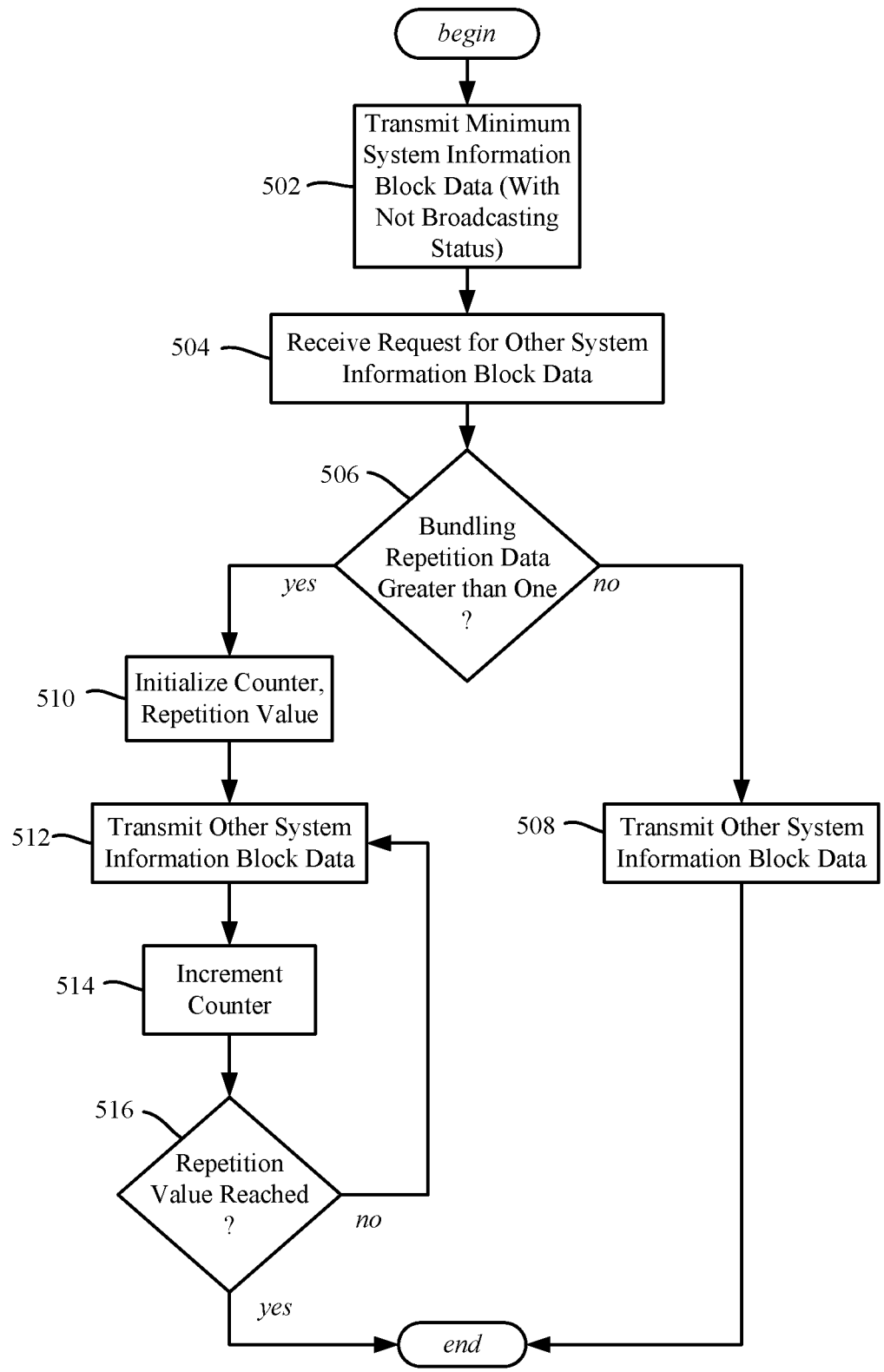
FIG. 5 is a flow diagram representing example operations related to a base station handling a request from a user equipment device for one or more transmission instances of other system information block data, in accordance with various aspects and embodiments of the subject disclosure.

FIG. 5 is a flow diagram showing example operations that can be performed by user equipment, beginning at operation 502 which represents transmitting the transmit minimum system information block data (with not broadcasting status), including the SIB1 which contains the reported RSRP value. Operation 504 represents receiving the request from a UE for the other system information block data.

Operation 506 evaluates the bundling (repetition) data field as described herein. If not greater than one, then a single transmission is made at operation 508, and the process ends until a next other SIB data request is received at some future time.

If instead the bundling (repetition) data field indicates a first transmission plus at least one retransmission, operation 510 is performed to initialize a counter or the like (e.g., to zero for counting up in this example). Operation 510 also determines the repetition value, if not directly known from the si-Delivery-Bundling field's parameter value. Note that as set forth herein, the base station can decide on the value, such as to use the largest value of two pending requests, or based on some other current condition data (e.g., increase for probability of high interference/frequent other SIB requests).

Operation 512 transmits the other system information block data in the appropriate system information window. Operation 514 increments the counter, and operation 516 repeats the transmission operation for a next instance until the repetition value is reached.

It should be noted that operation 508 can be performed via operations 510-516 by setting the repetition value such that only a single transmission occurs.

Figure 6:
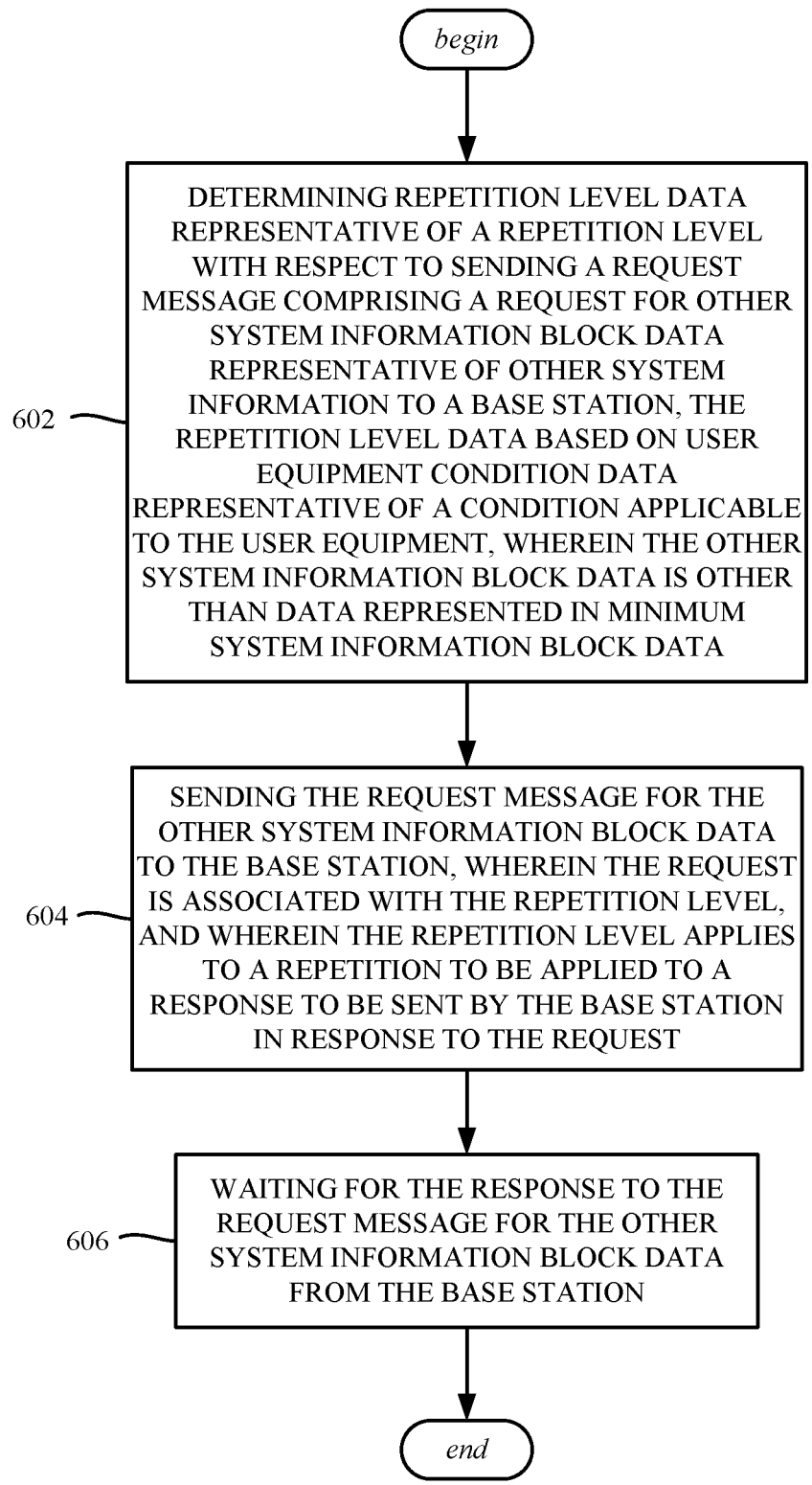
FIG. 6 is a flow diagram representing example operations related to a user equipment device determining repetition level data with respect to requesting other system information block data transmission(s) from a base station, in accordance with various aspects and embodiments of the subject disclosure.

One or more example aspects are represented in FIG. 6, and can correspond to a user equipment, including a processor, and a memory that stores executable instructions that, when executed by the processor, facilitate performance of operations. Example operation 602 represents determining repetition level data representative of a repetition level with respect to sending a request message comprising a request for other system information block data representative of other system information to a base station, the repetition level data based on user equipment condition data representative of a condition applicable to the user equipment, wherein the other system information block data is other than data represented in minimum system information block data. Example operation 604 represents sending the request message for the other system information block data to the base station, wherein the request is associated with the repetition level, and wherein the repetition level applies to a repetition to be applied to a response to be sent by the base station in response to the request. Example operation 606 represents waiting for the response to the request message for the other system information block data from the base station.

The user equipment condition data can include an estimated likelihood of failing to receive a correct response to the request by the user equipment.

Determining the repetition level data based on the estimated likelihood can include evaluating signal quality data representative of a signal quality applicable to transmission of data received from the base station.

Evaluating the signal quality data can include evaluating at least one of downlink signal strength data representative of a downlink signal strength applicable to the transmission of the data received from the base station, interference data representative of an interference applicable to the transmission of the data received from the base station, or path loss condition data representative of a path loss applicable to the transmission of the data received from the base station.

The corresponding reported reference signal strength data can include reference signal received power data.

Further operations can include receiving the minimum system information block data comprising system information block type1 data, measuring a reference signal strength of a reference signal to obtain measured reference signal strength data, and evaluating of the signal quality data further evaluating the measured signal strength data with respect to corresponding reported reference signal strength data within the system information block type1 data.

The request message can be a first request message, the user equipment can estimate a likelihood of failing to receive a correct version of the other system information block data before sending a request for other system information block data to the base station, and in response to the user equipment not receiving a correct version of the other system information block data, further operations can comprise sending, by the user equipment, a second request message for the other system information block data to the base station.

The repetition level data can indicate greater than one repetition applicable to the response to be sent by the base station in response to the request.

The repetition level data can be communicated via a repetition data field within the request message for the other system information block data.

Figure 7:
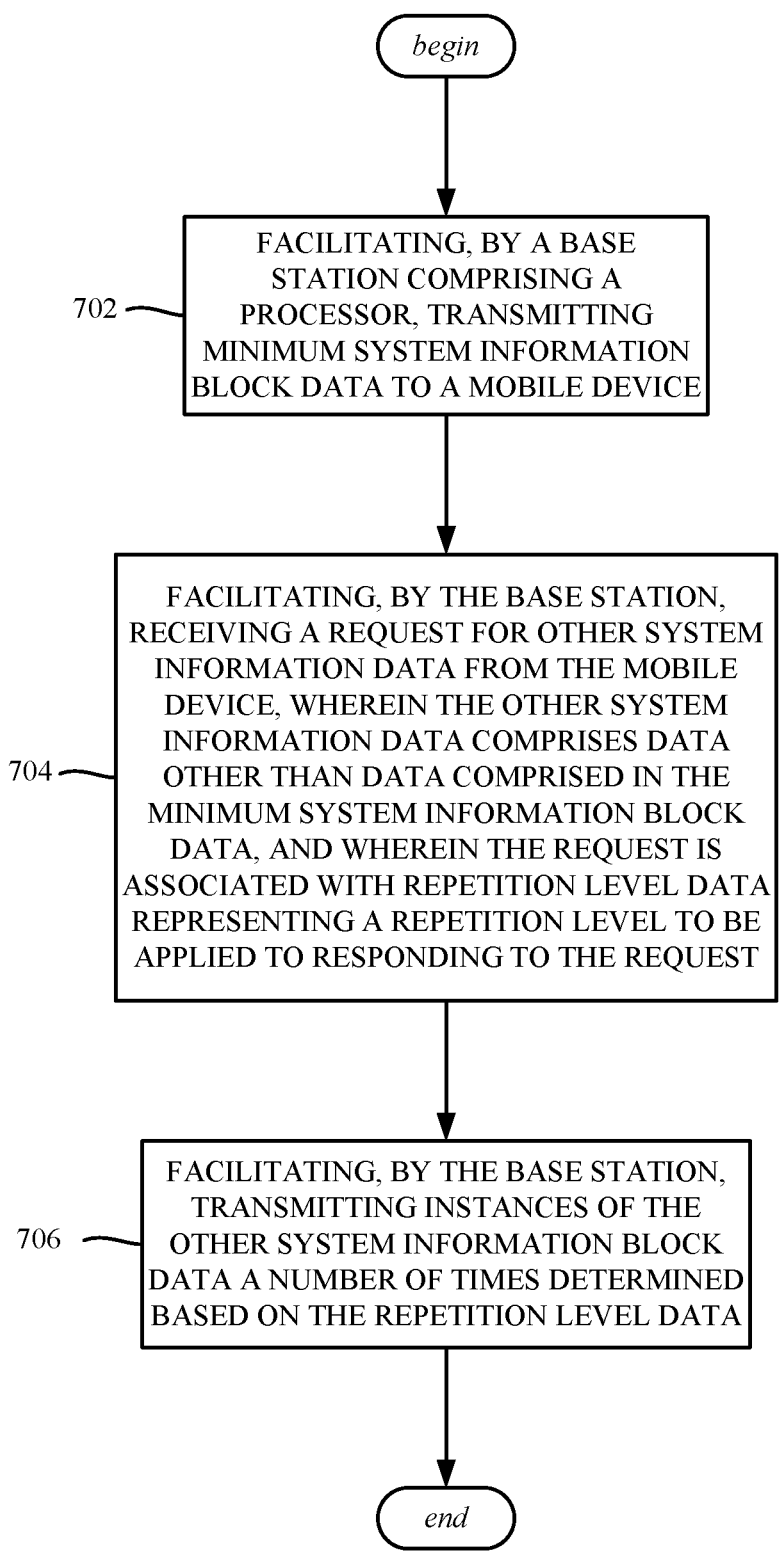
FIG. 7 is a flow diagram representing example operations related to a base station that transmits instance(s) of other system information block data to a user equipment device, in accordance with various aspects and embodiments of the subject disclosure.

One or more example aspects are represented in FIG. 7, and, for example, can correspond to operations, such as of a method. Example operation 702 represents facilitating, by a base station comprising a processor, transmitting minimum system information block data to a mobile device. Example operation 704 represents facilitating, by the base station, receiving a request for other system information data from the mobile device, wherein the other system information data comprises data other than data comprised in the minimum system information block data, and wherein the request is associated with repetition level data representing a repetition level to be applied to responding to the request. Example operation 706 represents facilitating, by the base station, transmitting instances of the other system information block data a number of times determined based on the repetition level data.

Further operations can include processing, by the base station, the request for the other system information data to obtain the repetition level data from a data field in the request.

Facilitating the transmitting of the instances of the other system information block data a number of times determined based on the repetition level data can include transmitting in a single transmission time interval.

Facilitating the transmitting of the instances of the other system information block data a number of times determined based on the repetition level data can include transmitting in a number of consecutive transmission time intervals.

Facilitating the transmitting of the instances of the other system information block data can include broadcasting the instances to attempt delivery to the mobile device, and wherein the broadcasting is performed the number of times.

Facilitating the transmitting of the instances of the other system information block data can include unicasting the instances to attempt delivery to the mobile device, and wherein the unicasting is performed the number of times.

Figure 8:
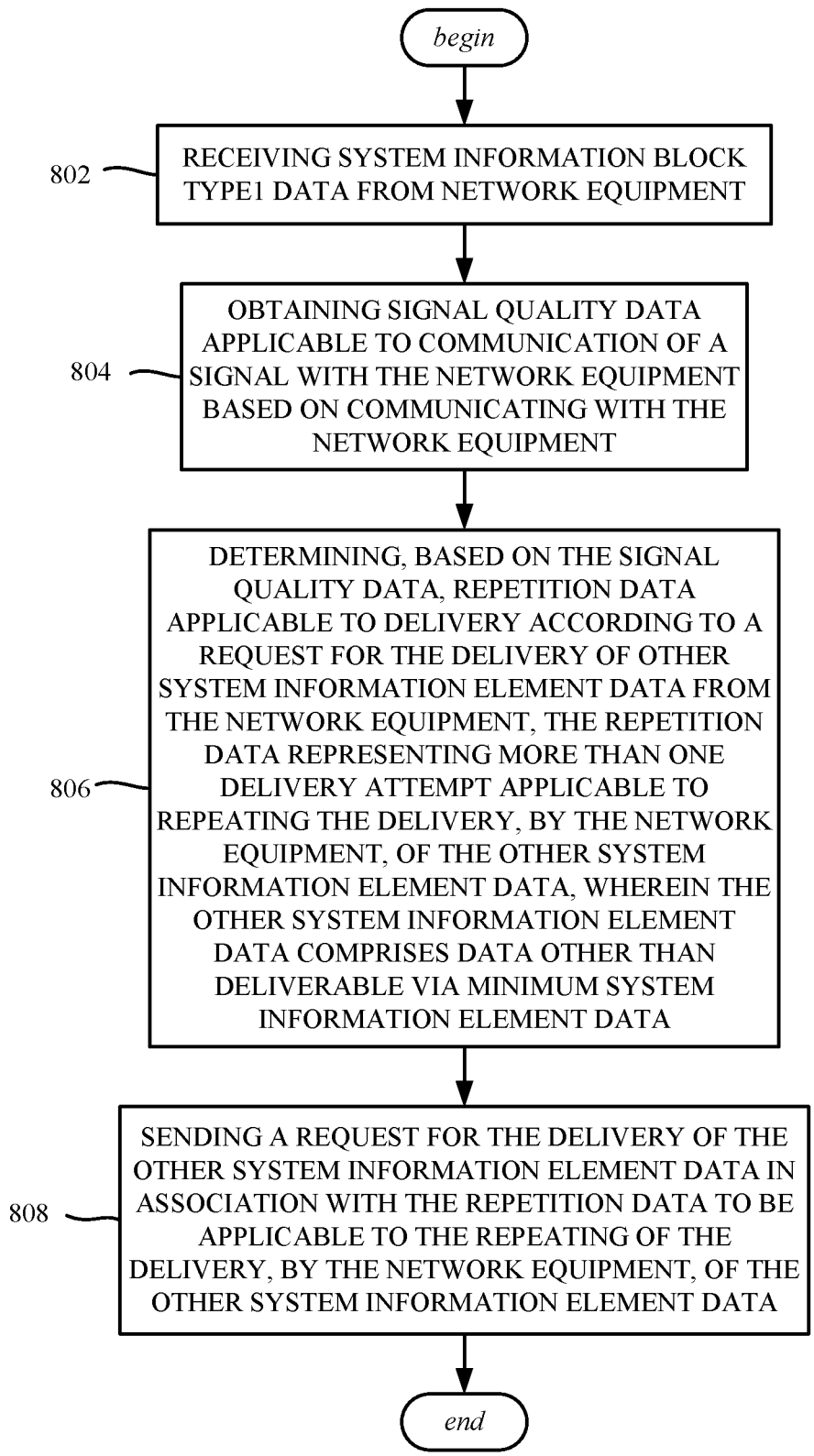
FIG. 8 is a flow diagram representing example operations related to a user equipment device determining repetition data, based on signal quality data, with respect to requesting other system information block data transmission(s) from a base station, in accordance with various aspects and embodiments of the subject disclosure.

One or more aspects are represented in FIG. 8, such as implemented in a machine-readable medium, including executable instructions that, when executed by a processor of a user equipment, facilitate performance of operations. Example operation 802 represents receiving system information block type1 data from network equipment. Example operation 804 represents obtaining signal quality data applicable to communication of a signal with the network equipment based on communicating with the network equipment. Example operation 806 represents determining, based on the signal quality data, repetition data applicable to delivery according to a request for the delivery of other system information element data from the network equipment, the repetition data representing more than one delivery attempt applicable to repeating the delivery, by the network equipment, of the other system information element data, wherein the other system information element data comprises data other than deliverable via minimum system information element data. Example operation 808 represents sending a request for the delivery of the other system information element data in association with the repetition data to be applicable to the repeating of the delivery, by the network equipment, of the other system information element data.

Obtaining the signal quality data based on the communicating with the network equipment can include waiting, by the user equipment, to receive the other system information element data, and receiving multiple instances of the other system information element data during a defined delivery window of the other system information element data The user equipment can receive multiple instances of the other system information element data, and can logically combine multiple instances of the of other system information block data to reduce a likelihood of failing to receive a correct version of the other system information block data.

Further operations can include processing the other system information element data, determining that the other system information element data has been correctly obtained, and in response, not requesting retransmission of other system information element data.

The repetition data can be based on a first repetition level determined based on the signal quality data.

As can be seen, the technology described herein facilitates more optimal user equipment and network resource usage by providing a way for a user equipment device to obtain multiple transmissions of system information block data without any retrying of the requesting of the data. Battery consumption can be reduced on the user equipment device, while signaling overhead is reduced on the network by avoiding retry requests.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
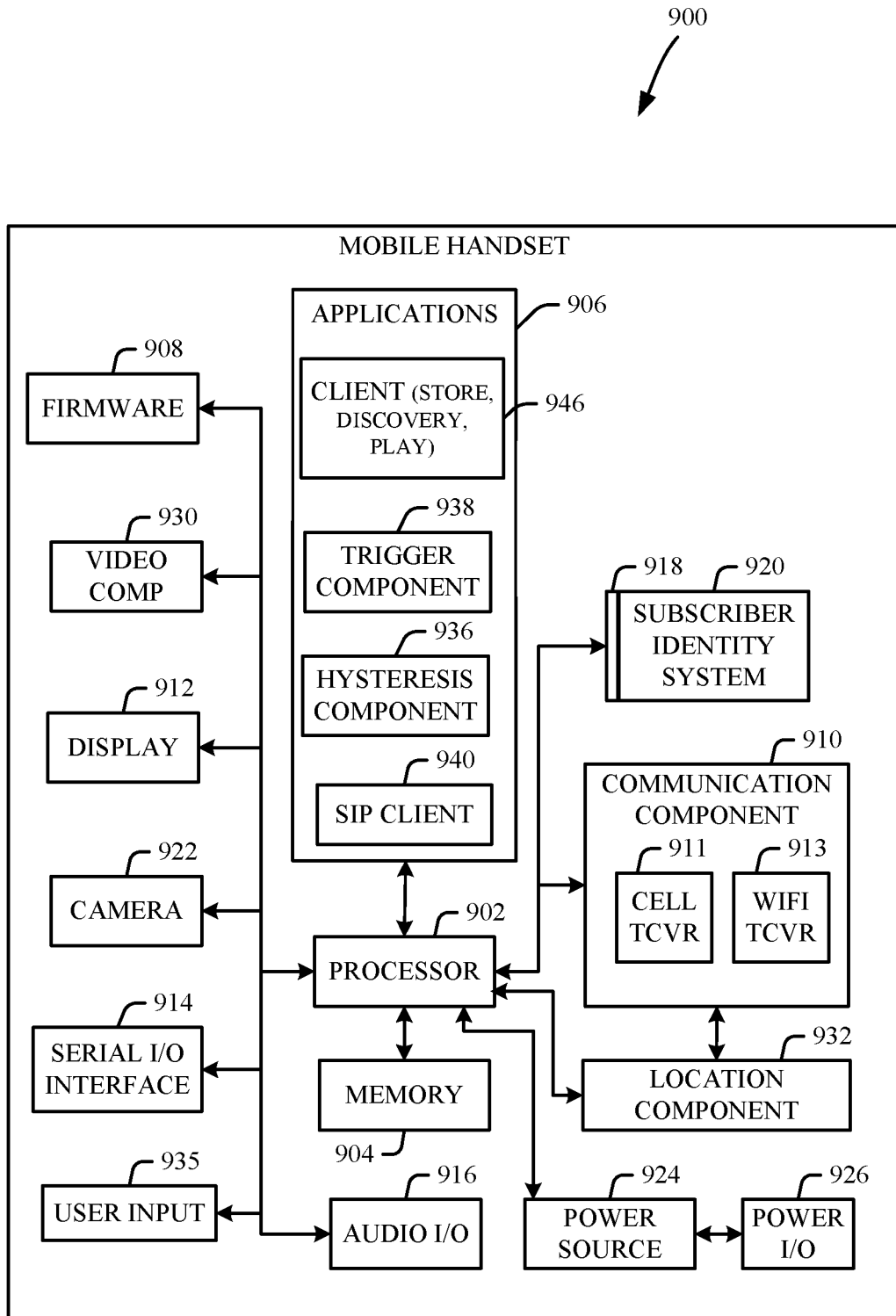
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
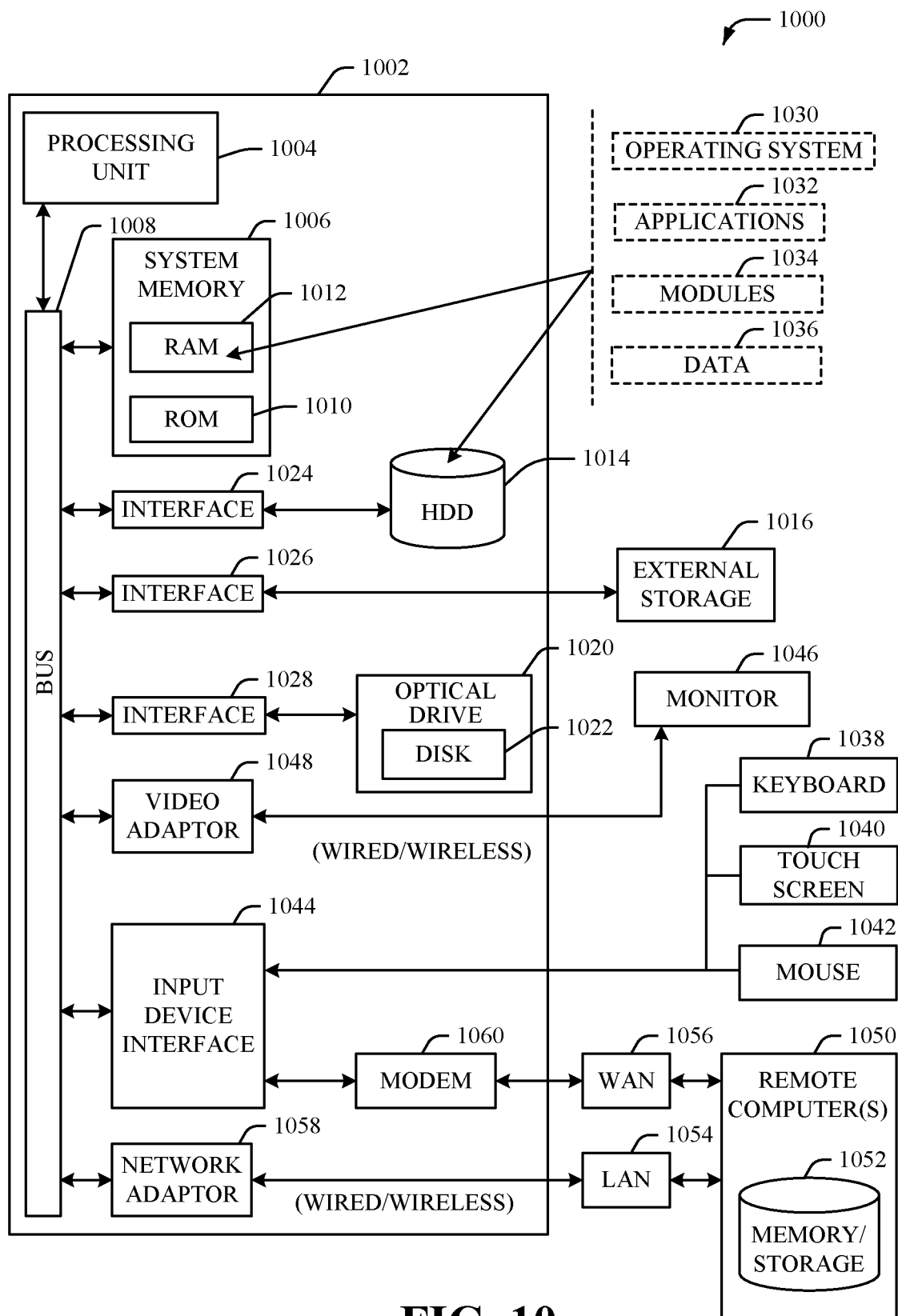
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
  a processor; and
  a memory that stores executable instructions that, when executed by the processor, facilitate performance of operations, the operations comprising:
    receiving minimum system information block data;
    based on the received minimum system information block data, determining that a base station broadcasts other system information block data on an on-demand basis;
    determining user equipment condition data based on communication with the base station and the received minimum system information block data;
    based on the determined user equipment condition data and a battery level of user equipment, determining repetition data indicating a number of transmissions in a bundle that the base station will make to attempt delivery of the other system information block data;
    sending a request message for the other system information block data to the base station, wherein the request message includes the repetition data to facilitate on-demand delivery of the other system information block data in the bundle of transmitted response messages;
    upon receiving at least one transmission of the other system information block data, decoding the other system information block data; and
    ending a process of obtaining the other system information block data upon successful decoding of the other system information block data.

2. The system of claim 1, wherein the user equipment condition data comprises an estimated likelihood of failing to receive a correct response to the request message by the user equipment.

3. The system of claim 2, wherein the determining the repetition data further comprises determining the repetition data based on the estimated likelihood by evaluating signal quality data applicable to transmission of data received from the base station.

4. The system of claim 3, wherein the evaluating of the signal quality data comprises evaluating at least one of downlink signal strength data representative of a downlink signal strength applicable to the transmission of the data received from the base station, interference data representative of an interference applicable to the transmission of the data received from the base station, or path loss condition data representative of a path loss applicable to the transmission of the data received from the base station.

5. The system of claim 3, wherein the determining user equipment condition data further comprise measuring reference signal received power based on the communication with the base station.

6. The system of claim 5, wherein:
the receiving the minimum system information block data further comprises receiving system information block type1 data, and
the evaluating of the signal quality data comprises evaluating the measured reference signal received power with respect to corresponding reported reference signal received power within the system information block type1 data.

7. The system of claim 1, wherein the request message comprises a data field having a parameter value, wherein the parameter value corresponds to a likelihood that the number of transmission in the bundle that the base station will make to attempt delivery of the other system information block data is greater than one.

8. The system of claim 7, wherein the parameter value in the data field is set to zero; and
wherein the operations further comprise requesting no additional transmission.

9. The system of claim 7, wherein the parameter value in the data field is set to be greater than zero, and the user equipment condition data indicate a likelihood that retransmission of the other system information block data is needed.

10. A method, comprising,
facilitating, by a base station comprising a processor, transmitting minimum system information block data to a mobile device;
evaluating, by the base station, signal quality data applicable to communication of a signal with the mobile device based on communicating with the mobile device;
facilitating, by the base station, receiving a request for other system information data including delivery repetition data from the mobile device, wherein the other system information data comprises data other than data comprised in the minimum system information block data, and wherein the delivery repetition data is determined based on the signal quality data and a battery level of the mobile device and indicates more than one repetition of delivery attempt, by the base station, of the other system information data; and
facilitating, by the base station, transmitting the other system information data according to the delivery repetition data, wherein the other system information data is provided in a bundle on an on-demand basis based on the request from the mobile device.

11. The method of claim 10, further comprising processing, by the base station, the request for the other system information data to determine the repetition of delivery attempt of the other system information data from a data field in the request.

12. The method of claim 10, wherein the facilitating of the transmitting the other system information data according to the delivery repetition data comprises transmitting in a single transmission time interval.

13. The method of claim 10, wherein the facilitating the transmitting the other system information data according to the delivery repetition data comprises transmitting in a number of consecutive transmission time intervals.

14. The method of claim 10, wherein facilitating the transmitting the other system information data comprises broadcasting the other system information data to the mobile device according to the delivery repetition data.

15. A non-transitory machine-readable medium, comprising executable instructions that, when executed by a processor of a user equipment, facilitate performance of operations, the operations comprising:
receiving system information block type1 data from network equipment;
obtaining signal quality data applicable to communication of a signal with the network equipment based on communicating with the network equipment;
determining, based on the signal quality data and a battery level of the user equipment, delivery repetition data according to a request for delivery of other system information element data from the network equipment, the delivery repetition data indicating more than one repetition of delivery attempt, by the network equipment, of the other system information element data, wherein the other system information element data are different from minimum system information element data; and
sending the request for delivery of the other system information element data including the delivery repetition data of the other system information element data.

16. The non-transitory machine-readable medium of claim 15, wherein the obtaining of the signal quality data based on the communicating with the network equipment comprises measuring reference signal received power, and
wherein determining, based on the signal quality data, the delivery repetition data comprises:
obtaining reported reference signal received power data from the system information block type1 data, and
evaluating the reported reference signal received power data relative to measured reference signal received power data.

17. The non-transitory machine-readable medium of claim 15, wherein the operations further comprise waiting, by the user equipment, to receive the other system information element data, and receiving multiple instances of the other system information element data during a defined delivery window of the other system information element data.

18. The non-transitory machine-readable medium of claim 17, wherein the operations further comprise:
processing the other system information element data,
determining that the other system information element data has been correctly obtained, and
in response, not requesting retransmission of other system information element data.

19. The non-transitory machine-readable medium of claim 15, wherein the user equipment receives multiple instances of the other system information element data, and logically combines multiple instances of the other system information element data to reduce a likelihood of failing to receive a correct version of the other system information element data.

20. The non-transitory machine-readable medium of claim 15, wherein the request comprises a data field having a parameter value, wherein the parameter value corresponds to a likelihood indicating more than one repetition of delivery attempt, by the network equipment, of the other system information element data.

* * * * *